Jan. 30, 1951     E. WOLD     2,539,765
EDUCATIONAL TOY
Filed March 29, 1947
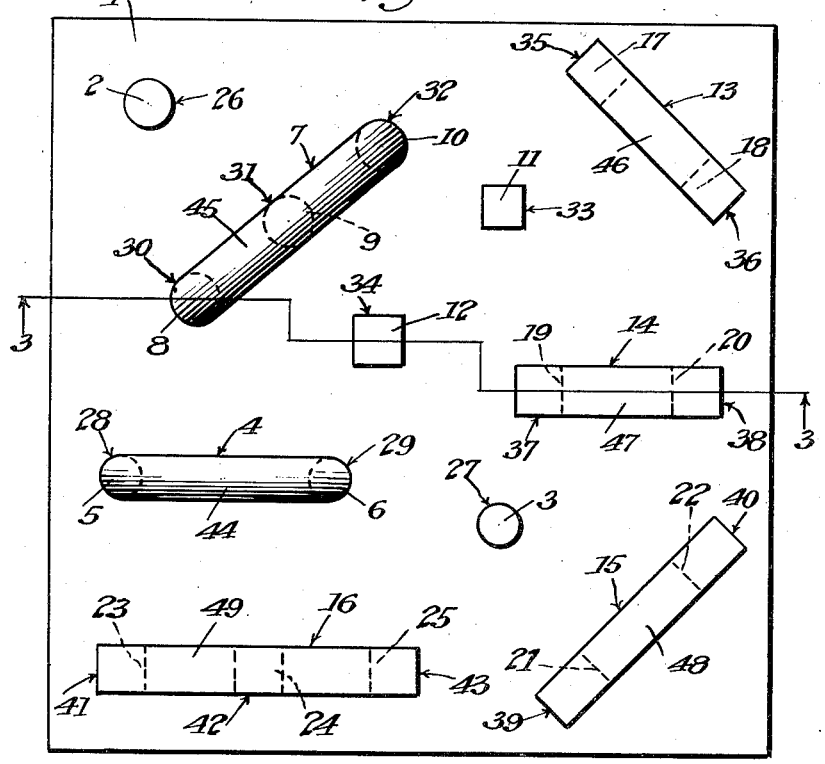
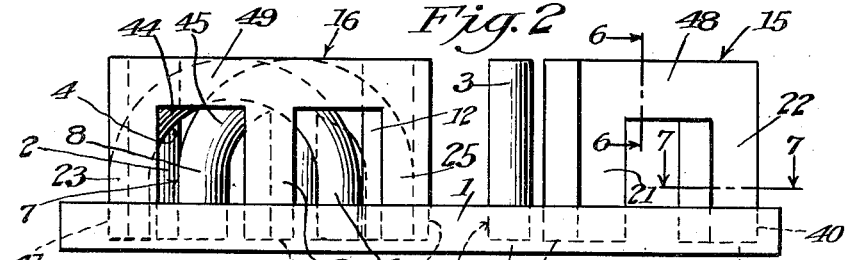
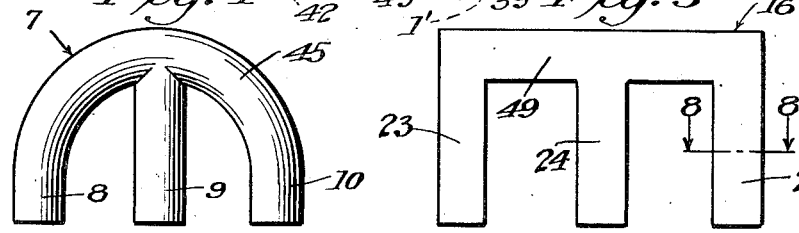
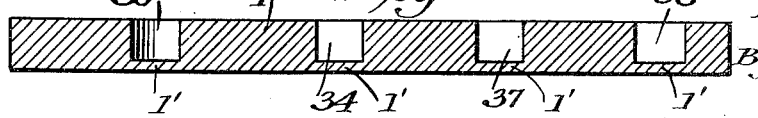
Inventor:
Eleanor Wold,
By Alan Franklin,
Attorney.

Patented Jan. 30, 1951

2,539,765

UNITED STATES PATENT OFFICE 2,539,765

EDUCATIONAL TOY

Eleanor Wold, Los Angeles, Calif.

Application March 29, 1947, Serial No. 738,106

3 Claims. (Cl. 35—22)

This invention relates to toys, and more particularly to an educational toy.

The general object of the invention is to provide an attractive, interesting and amusing educational toy, by means of which children may easily learn different shapes of objects and different colors.

A more particular object is to provide an educational toy comprising a plurality of single pegs and multiple peg units of different shapes and colors, and a board provided with a plurality of holes of different shapes and suitably arranged to receive said single pegs and said pegs of said multiple peg units, so that a child with a little practice may soon learn to place the different pegs in the holes arranged, respectively, to receive them.

Other objects and advantages will appear hereinafter.

The invention is illustrated in the annexed drawing, which forms a part of this specification and in which:

Fig. 1 is a plan view of my invention showing the pegs placed correctly in the holes in the board of the toy.

Fig. 2 is a side elevation of Fig. 1.

Fig. 3 is a transverse vertical section of my invention taken on line 3—3 of Fig. 1.

Fig. 4 is a side elevation of one of the multiple peg units.

Fig. 5 is a side elevation of another multiple peg unit.

Fig. 6 is a cross section of the connecting member of the multiple peg unit shown in Figs. 1 and 2, taken on line 6—6 of Fig. 2.

Fig. 7 is a cross section of one of the legs of one of the peg units shown in Figs. 1 and 2, taken on line 7—7 of Fig. 2.

Fig. 8 is a cross section of one of the legs of the peg unit shown in Fig. 5, taken on line 8—8 of Fig. 5.

Referring more particularly to the drawings, in which corresponding parts are designated by the same reference numerals in all of the figures, my invention comprises a board 1 and two round pegs 2 and 3; a multiple peg unit 4 including a pair of round pegs 5 and 6; a multiple peg unit 7 including three round pegs 8, 9 and 10; two single square pegs 11 and 12; and four multiple peg units 13, 14, 15 and 16; the unit 13 including two square pegs 17 and 18; the unit 14 including two square pegs 19 and 20; the unit 15 including two pegs 21 and 22 which are oblong in cross section; and the unit 16 including three square pegs 23, 24 and 25.

The board 1 is provided with holes 26, 27, 28 and 29; 30, 31 and 32; 33, 34, 35 and 36; 37 and 38; 39 and 40; and 41, 42 and 43, which holes extend downwardly in the board from the upper surface of the board only part way through the board, providing a bottom wall 1' for each hole, upon which walls the lower ends of the pegs rest, so that upon lifting the board from a support the pegs will be retained in the board by said bottom walls.

The holes 26 and 27 are round and are of a size to receive the single pegs 2 and 3, respectively. The holes 28 and 29 are round and of a size to receive the pegs 5 and 6 of the peg unit 4. The holes 30, 31 and 32 are round and of a size to receive the pegs 8, 9 and 10 of the peg unit 7. The holes 33 and 34 are square and of a size to receive the single square pegs 11 and 12, respectively. The holes 35 and 36 are square and of a size to receive the pegs 17 and 18 of the peg unit 13. The holes 37 and 38 are square and of a size to receive the pegs 19 and 20 of the peg unit 14. The holes 39 and 40 are oblong and of a size to receive the oblong pegs 21 and 22 of the peg unit 15. The holes 41, 42 and 43 are square and of a size to receive the pegs 23, 24, and 25 of the peg unit 16.

The round hole 26 and round peg 2 are of larger diameter than the round hole 27 and round peg 3, so that the peg 2 will not fit in the hole 27, and the peg 3 will not fit snugly in the hole 26. The peg unit 4 includes an arcuate cylindrical connecting member 44 of the same diameter as the pegs 5 and 6 of said unit and connects at its ends said pegs at a given distance apart, and the holes 28 and 29 are spaced at the same distance apart as the pegs 5 and 6 to receive said pegs. The peg unit 7 includes an arcuate cylindrical connecting member 45 of the same diameter as the pegs 8, 9 and 10 of said unit, and the pegs 8 and 10 are connected at their upper ends to the ends, respectively, of said connecting member, while the peg 9 is connected at its upper end to said connecting member intermediate the ends of said member, whereby said pegs 8, 9 and 10 are connected at such distances apart as to fit only in the round holes 30, 31 and 32, respectively, in the board 1. The pegs 8, 9 and 10 of unit 7 and the holes 30, 31 and 32 for said pegs are larger in diameter than the pegs 5 and 6, and the holes 28 and 29 for said pegs, so that the pegs 8, 9 and 10 cannot fit in the holes 28 and 29, and the pegs 5 and 6 are too small to fit the holes 30, 31 and 32. Furthermore, the pegs 5 and 6, and the holes 28 and 29 are spaced further apart than the holes 30 and 31, 31 and 32, and 30 and 32, so that pegs 5 and 6 of unit 4 will not fit in any two of the holes 30, 31 and 32, and the unit 7 having three pegs 8, 9 and 10 said pegs cannot fit in the two holes 28 and 29 for the unit 4.

The square peg 11 and hole 33 are smaller in cross sectional area than the square peg 12 and hole 34, so that the peg 11 is too small to fit the hole 34 and the peg 12 is too large to fit the hole 33.

The unit 13 includes a square connecting bar 46 of the same size as the square pegs 17 and 18 of said unit, which bar is connected at its ends to the upper ends of said pegs at right angles to said pegs, whereby said pegs are connected at such distance apart by said bar as to fit in the square holes 35 and 36 in the board 1.

The unit 14 includes a square connecting bar 47 of the same size as the square pegs 37 and 38, which bar is connected at its ends to the upper ends of said pegs, respectively, at right angles to said pegs, whereby said pegs are connected at such distance apart as to fit in the square holes 37 and 38 in the board 1.

The unit 15 includes an oblong connecting bar 48 of the same size as the oblong pegs 21 and 22, which bar is connected at its ends to the upper ends of said pegs, respectively, at right angles to said pegs, whereby said pegs are connected at such distance apart as to fit in the oblong holes 39 and 40 in the board 1.

The unit 16 includes a square connecting bar 49 of the same size as the square pegs 23, 24 and 25, which bar is connected at its ends to the upper ends of the square pegs 23 and 25 and is connected intermediate its ends to the upper end of the peg 24, whereby said pegs are connected at such distances apart that the pegs 23, 24 and 25 will fit in the square holes 41, 42 and 43, respectively, in the board 1.

The lengths of the bars 46, 47 and 49 of the units 13, 14 and 16, respectively, are different, which lengths of said bars space apart at different distances the pegs 17 and 18 of unit 13, the pegs 19 and 20 of unit 14, and the pegs 23, 24 and 25 of unit 16, respectively, and the holes 35 and 36, the holes 37 and 38, and the holes 41, 42 and 43 are spaced apart at correspondingly different distances to receive only the pegs of said units, respectively, so that the pegs of any of said units cannot be inserted in the holes for the pegs of any of said other units. The pegs 21 and 22 of unit 15 and the holes 39 and 40 for said pegs being oblong, said pegs will not fit in any of the other holes in the board, which other holes are either round or square, and none of the square or round pegs will fit in said oblong holes 39 and 40 for the unit 15.

The single pegs and the multiple peg units may be of different colors.

The operation, uses and advantages of my invention are as follows:

In playing with my toy a child, by trial and error, learns to place the pegs of the various peg units in the right holes in the board, and learns the differences between the shapes, sizes and colors of said pegs and how to count up to 10, since there are ten peg units altogether, so that the toy is both amusing and educational to a child.

I claim:

1. An educational toy including a board provided with a plurality of groups of holes, each group including the same number of holes in the same spaced relation as said other groups, said board being also provided with a plurality of single holes, each associated with one of said groups of holes, a peg unit formed with a number of pegs corresponding in number and spaced relation to the number and spaced relation of the holes of each of said groups of holes for fitting in the holes of each of said groups, respectively, and a single peg for fitting in any one of said holes.

2. An educational toy including a board provided with a plurality of groups of holes, each of said groups including the same number of holes in the same spaced relation and of the same cross section as said other groups of holes, said board being provided with a second plurality of groups of holes, each of said second plurality of groups of holes including the same number of holes, in the same spaced relation and of the same cross section, as said other groups of holes in said second plurality of groups of holes, but of different cross section from the holes of said first plurality of groups of holes, a peg unit formed with pegs corresponding in number, spaced relation and cross section to the holes in each group of holes in said first plurality of groups of holes for fitting in the holes in each group of said holes in said first plurality of groups of holes, and a second peg unit formed with pegs corresponding in number, spaced relation and cross section to the holes in each group of holes in said second plurality of groups of holes for fitting in the holes of each group of holes in said second plurality of groups of holes.

3. An educational toy as claimed in claim 2 including single holes of different cross section in said board associated with said groups of holes.

ELEANOR WOLD.

REFERENCES CITED

The following references are of record in the file of this patent:

UNITED STATES PATENTS

| Number | Name | Date |
|---|---|---|
| 518,061 | Fuller | Apr. 10, 1894 |
| 610,577 | Baldwin | Sept. 13, 1898 |
| 741,903 | Gates | Oct. 20, 1903 |
| 2,327,718 | Kassler | Aug. 24, 1943 |
| 2,339,074 | Hogan | Jan. 11, 1944 |
| 2,377,100 | Patterson | May 29, 1945 |
| 2,416,959 | Segal | Mar. 4, 1947 |
| 2,477,825 | Richardson | Aug. 2, 1949 |

OTHER REFERENCES

Catalogue of "C. H. Stoelting Co." covering Psychological and Physiological Apparatus and Supplies; received in Patent Office Library Aug. 6, 1930; page 129.